United States Patent

[11] 3,622,625

| [72] | Inventors | Milton Wolf<br>West Chester;<br>John H. Sellstedt, St. Davids, both of Pa. |
|---|---|---|
| [21] | Appl. No. | 735,560 |
| [22] | Filed | June 10, 1968 |
| [45] | Patented | Nov. 23, 1971 |
| [73] | Assignee | American Home Products Corporation<br>New York, N.Y. |

[54] N-SULFAMOYL-P-TOLUENSULFONAMIDE
1 Claim, No Drawings

[52] U.S. Cl.................................................. 260/556 N,
260/556 SN, 260/397.7 R, 260/293.4 G,
260/239.8, 260/247.1, 260/239.6, 260/326.11,
260/326.3, 260/326.5 SF, 260/326.82, 260/239.7,
260/268 PH, 260/268 RS, 260/470, 424/321,
424/267, 424/248, 424/274, 424/250

[51] Int. Cl.................................................. C07c 143/78
[50] Field of Search.......................................... 260/556 N,
556 SN

[56] References Cited
UNITED STATES PATENTS
3,483,208  12/1969  Bahr et al. ................ 260/556 NSN

*Primary Examiner* — Henry R. Jiles
*Assistant Examiner* — S. D. Winters
*Attorneys* — Andrew Kafko, Joseph Martin Weigman, Dwight J. Potter and Vito Victor Bellino

ABSTRACT: This invention is concerned with sulfamoyl substituted sulfonamides which have demonstrated pharmacological activity as central nervous system depressants.

N-SULFAMOYL-P-TOLUENSULFONAMIDE

The present invention relates to new and novel sulfonamides. In particular, this invention concerns sulfamoyl aryl substituted sulfonamides which in standard and accepted pharmacological tests have demonstrated central nervous system depressant activity.

The new and novel compounds within the scope of the present invention are exemplified by the following structural formula:

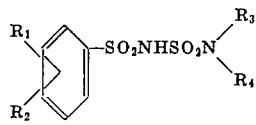

wherein $R_1$ when taken separately is selected from the group consisting of hydrogen, lower alkyl, lower alkoxy, trifluoromethyl, halogen, nitro, amino, di(lower)alkylamino, carbamoyl, sulfamoyl, carb(lower)alkyl, lower alkylthio, lower alkylsulfonyl and lower alkanoylamido; $R_2$ when taken separately is selected from the group consisting of hydrogen, lower alkyl, lower alkoxy, halogen, nitro and amino; $R_1$ and $R_2$ when taken together with the phenyl group to which they are attached form a naphthyl group; $R_3$ and $R_4$ when taken separately are selected from the group consisting of hydrogen and lower alkyl; $R_3$ and $R_4$ when taken together with the nitrogen atom to which they are attached form a substituent selected from the group consisting of pyrrolidino, piperidino, morpholino, piperazino, lower alkylpiperazino, phenylpiperazino, halophenylpiperazino and indolino; and the pharmacologically acceptable alkali metal salts thereof. Typical examples of the compounds of this invention are: N-dimethylsulfamoyl-p-toluenesulfonamide; N-sulfamoyl-p-toluenesulfonamide; p-nitro-N-sulfamoylbenzenesulfonamide; N'-sulfamoylsulfanilamide; p-chloro-N-sulfamoylbenzenesulfonamide; p-chloro-N-dimethylsulfamoylbenzenesulfonamide; N-dimethylsulfamoyl-p-methoxybenzenesulfonamide; N-dimethylsulfamoyl-2-naphthlenesulfonamide; p-methoxy-N-sulfamoylbenzenesulfonamide; and N-dimethylsulfamoyl-p-fluorobenzenesulfonamide.

The new and novel sulfamoyl aryl substituted sulfonamides of the present invention are prepared by the process which is illustrated by the following reaction scheme:

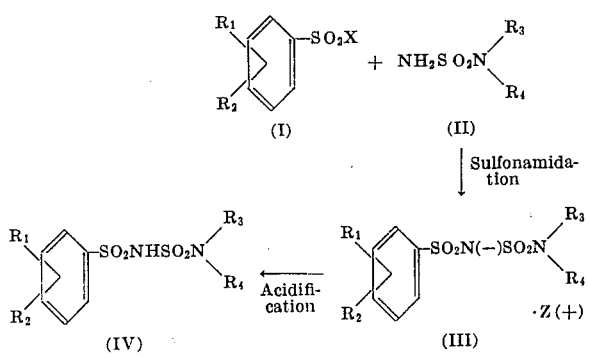

wherein $R_1$, $R_2$, $R_3$ and $R_4$ are defined as above, and X is halogen and Z is an alkali metal. The above sulfonamidation reaction is effected by contacting an appropriate sulfonyl halide (I) with a sulfamide (II), in the presence of an alkali metal carbonate, in a reaction-inert aprotic organic solvent at a temperature range from about 25° C. to about reflux temperatures for a period of about 4 to about 20 hours. Preferably this reaction is conducted with a sulfonyl chloride, in the presence of potassium carbonate, in dioxane.

When the sulfonamidation reaction is complete, the resulting sulfamoyl aryl substituted sulfonamide alkali metal salt (III) is recovered by conventional procedures e.g. the reaction mixture is cooled and filtered to afford the solid salt (III). The acid form of the sulfamoyl aryl substituted sulfonamide (IV) is produced by standard methods. For example, the above prepared sulfamoyl aryl substituted sulfonamide alkali metal salt (III) is dissolved in water, acidified with a mineral acid e.g. concentrated hydrochloric acid, extracted with a water-immiscible organic solvent e.g. ether which extract is in turn extracted with an aqueous alkali metal bicarbonate solution e.g. sodium bicarbonate, subsequently the bicarbonate extract is acidified with a mineral acid, e.g. concentrated hydrochloric acid, extracted with a water-immiscible organic solvent e.g. ether, the ether extract is washed with a saturated salt solution e.g. sodium chloride, dried with sodium sulfate, evaporated and the residue recrystallized from a suitable solvent to afford an appropriate sulfamoyl aryl substituted sulfonamide (IV).

An alternative process for the preparation of some of the compounds of the present invention, in particular, the unsubstituted sulfamoyl aryl substituted sulfonamides is depicted by the following reaction sequence:

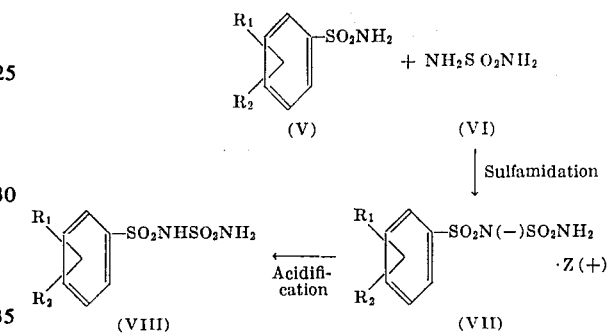

wherein $R_1$, $R_2$ and Z are defined as above. The above sulfamidation reaction is effected by contacting an appropriate sulfonamide (V) with sulfamide (VI), in the presence of an alkali metal hydroxide or carbonate, in water at a temperature range of about 60° C. to about reflux temperatures for a period of about 2 to about 16 hours. Preferably this reaction is conducted, in the presence of sodium hydroxide, at about the reflux temperature of the reaction mixture for about 3 hours.

When the sulfamidation reaction is complete, the resulting unsubstituted sulfamoyl and substituted sulfonamide alkali metal salt (VII) may be recovered by standard recovery techniques e.g. the reaction mixture is evaporated to dryness and the residue recrystallized from an appropriate solvent. This alkali metal salt (VII) may then be converted to its corresponding acid form (VIII) by standard chemical techniques. Alternatively, the reaction mixture containing the above prepared unsubstituted sulfamoyl aryl substituted sulfonamide alkali metal salt (VII) may be so treated to convert the unisolated salt to its corresponding acid form. For example, the reaction mixture containing the unsubstituted sulfamoyl aryl substituted sulfonamide (VII) is cooled, diluted with water, washed with an ether-ethyl acetate mixture, strongly acidified with a mineral acid e.g. hydrochloric acid, extracted with a water-immiscible organic solvent e.g. ether, then the ether extract is washed with a salt solution, dried over sodium sulfate, evaporated and recrystallized from a suitable solvent to afford the appropriate unsubstituted sulfamoyl aryl substituted sulfonamide (VIII).

A further alternative process for the preparation of the sulfamoyl aminoaryl substituted sulfonamides of the present invention involves the hydrogenation of the corresponding sulfamoyl nitroaryl substituted sulfonamides of this invention by standard procedures. For example, the sulfamoyl nitroaryl substituted sulfonamide, as prepared by one of the prior reactions, is dissolved in an alkanol or alkanol-water mixture and then contacted with platinum oxide in the presence of about two atmospheres of hydrogen gas for about 2 hours. Thereafter, the product is recovered by standard techniques, e.g. the reaction mixture is filtered, evaporated under vacuum and recrystallized from a suitable solvent to afford the appropriate sulfamoyl aminoaryl substituted sulfonamide.

The starting materials, such as the sulfonyl halides (I), the sulfamides (II) and the sulfonamides (V), employed in the above-described reactions are commercially available and/or are easily prepared by procedures well known in the art of chemistry. The term "reaction-inert aprotic organic solvent" as employed in the first above-described reaction is meant to include organic solvents which do not have ionized protons and which will dissolve the reactants without interfering with their interaction. Many such solvent will readily suggest themselves to one skilled in the art, for example, dioxane, tetrahydrofuran, dimethoxyethane and the like. The amount of solvent used is not critical, it being only necessary to use sufficient solvent to provide a reaction medium for the reactants. As employed in the three above-described reactions, the term "suitable solvent" which is used to describe the solvent employed for the recrystallization of the sulfamoyl aryl substituted sulfonamides of the present invention is meant to include such solvents as: alkanols, ethyl acetate-liquid alkanes, ethyl acetate-liquid cycloalkanes, ether-liquid alkanes and alkanol-water mixtures. The time and temperature ranges employed in the above reactions are not critical and simply represent the most convenient ranges consistent with carrying out the reaction in a minimum of time without undue difficulty. Thus, reaction temperatures appreciably below these can be used, but their use considerably extends the reaction time. Similarly, reaction temperatures higher than those mentioned can be employed with a concomitant decrease in reaction time.

The new and novel sulfamoyl aryl substituted sulfonamides and the alkali metal salts thereof of the present invention possess valuable pharmacological activity. In particular, these compounds in standard pharmacological procedures demonstrate nervous system activity and are useful as depressants in producing a calming effect in warm-blooded animals.

In the pharmacological evaluation of the central nervous system depressant compounds of this invention the in vivo effects of the compounds of this invention are tested as follows:

The compound is administered orally or intraperitoneally to three mice (14 to 24 grams) at each of the following doses: 400, 127, 40 and 12.7 mg./kg. The animals are watched for a minimum of 2 hours during which time signs of general stimulation (i.e., increased spontaneous motor activity, hyperactivity on tactile stimulation, twitching), general depression (i.e., decreased spontaneous motor activity, decreased respiration, and autonomic activity (i.e., miosis, mydriasis, diarrhea) are noted. The animals are tested for changes in refluxes (i.e. flexor, extensor) and are rated by use of a pole climb and inclined screen for the presence of sedation-ataxia. The "Eddy Hot-Plat method" [Nathan B. Eddy and Dorothy Leimbach, J. Pharmacol. Exper. Therap. 107, 385 (1953)] is used to test for analgesia. The experiment is terminated by subjecting each animal to a maximal electroshock to test for anticonvulsant activity.

The compounds of this invention in the above test procedure when administered orally and intraperitoneally induce decreased motor activity and decreased respiration at a dosage range of 127 mg. to 400 mg./kilo of animal body weight. There were no deaths in the test animals at the highest oral and intraperitoneal dose used, 400 mg./kg.

When the compounds of this invention are employed as central nervous system depressants they may be administered to warm-blooded animals, e.g. mice, rats, rabbits, dogs, cats, monkeys, etc. alone or in combination with pharmacologically acceptable carriers, the proportion of which is determined by the solubility and chemical nature of the compounds, chosen route of administration and standard biological practice. For example, they may be administered orally in the form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present central nervous system depressants will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration and are not to be construed as limitations of this invention, many variations of which are possible without departing from the scope and spirit thereof.

EXAMPLE I

A mixture of p-toluenesulfonyl chloride (16.9 g., 0.089 mole), N,N-dimethylsulfamide (10.0 g., 0.081 mole), and potassium carbonate (28.9 g., 0.209 mole) is stirred and heated at about 70° C. in anhydrous dioxane (100 ml.) for 15 hours. The mixture is then heated to about 90° C. for 1½ hours, followed by cooling to 20° C. The mixture is filtered with suction, and the salt is dissolved in water (2×200 ml.) and filtered with suction. The filtrate is cooled in ice (10° C.), and strongly acidified with concentrated hydrochloric acid. The mixture is extracted with ether (2×150 ml.), and the ether is extracted with 5 percent aqueous sodium bicarbonate solution (2×150 ml.). The bicarbonate solution is cooled in ice and strongly acidified with concentrated hydrochloric acid. The acidic mixture is extracted with ether (2×150 ml.), and the ether is washed with saturated aqueous sodium chloride and dried with sodium sulfate. The ether is removed on a rotary evaporator, giving a white solid (10.1 g., 49 percent), m.p. 101°–105° C. (uncorr.). The crude solid is recrystallized from benzene-cyclohexane, giving white crystals of N-dimethyl-sulfamoyl-p-toluenesulfonamide (7.9 g.; 35 percent), m.p. 103°–105° C. (uncorr.).

Anal. Calcd for $C_9H_{14}N_2O_4S_2$: C, 38.83; H, 5.07; N, 10.07.
Found: C, 39.06; H, 5.31; N, 9.90.

In a similar manner, p-toluenesulfonyl chloride is reacted with diethylsulfamide to afford N-diethylsulfamoyl-p-toluenesulfonamide.

EXAMPLE II

A solution of p-toluenesulfonyl chloride (19.1 g., 0.10 mole) in anhydrous dioxane (25 ml.) is added to a mixture of sulfamide (10.6 g., 0.11 mole) and potassium carbonate (34.6 g., 0.25 mole) in anhydrous dioxane (125 ml.), and the mixture is reacted and worked-up in a manner similar to example I, giving a crude white solid (15.9 g.), m.p. 110°–123° C. (uncorr.). The crude solid is recrystallized from ethyl acetate-hexane, giving white crystals of N-sulfamoyl-p-toluenesulfonamide (7.4 g., 30 percent), m.p. 132–134° C. (uncorr.).

Anal. Calcd for $C_7H_{10}N_2O_4S_2$: C, 33.59; H, 4.03; N, 11.19; S, 25.62. Found: C, 33.66; H, 3.84; N, 11.19; S, 25.1, 25.1.

Similarly, 2-nitro-4-toluenesulfonamide is reacted with sulfamide to yield 2-nitro-N-sulfamoyl-4-toluenesulfonamide.

EXAMPLE III

A mixture of p-toluenesulfonamide (17.1 g., 0.10 mole), sulfamide (12.5 g., 0.13 mole), and sodium hydroxide (4.5 g., 0.112 mole) is combined with water (50 ml.), and refluxed under a stream of nitrogen for 2½ hours with evolution of ammonia. The solution is cooled and water (300 ml.) is added. The solution is washed with 1:1 ether-ethyl acetate (2×200 ml.), cooled to 0° C., and strongly acidified with concentrated hydrochloric acid. The mixture is extracted with ether (2×150 ml.), the ether is washed with saturated aqueous sodium chloride, and dried through sodium sulfate. The ether is removed on a rotary evaporator, giving a white solid of N-sulfamoyl-p-toluenesulfonamide, (7.3 g., 29 percent), m.p. 134°–136° C. (uncorr.), which gives no depression in mixed m.p., 133°–136° C. (uncorr.), with the sample from example II m.p. 132°–134° C. (uncorr.).

EXAMPLE IV

A solution of p-nitrobenzenesulfonyl chloride (22.2 g., 0.10 mole) in anhydrous dioxane (30 ml.) is added to a mixture of sulfamide (10.6 g., 0.11 mole) and potassium carbonate (34.6 g., 0.25 mole) in anhydrous dioxane (125 ml.), and the mixture is reacted and worked-up in a manner similar to example I, giving a crude yellow solid (9.2 g.), m.p. 146° C. bubbles (uncorr.). The crude solid is recrystallized from ethyl acetate-hexane, giving yellow crystals of p-nitro-N-sulfamoyl-benzenesulfonamide, (7.4 g., 26 percent), m.p. 150°–152° C. (uncorr.).

Anal. Calcd for $C_6H_7N_3O_6S_2$: C, 25.62; H, 2.51; N, 14.94; S, 22.80.

Found: C, 25.89; H, 2.54; N, 14.93; S, 22.4, 22.6.

Similarly, p-sulfamoylbenzenesulfonyl chloride is reacted with sulfamide to yield N,p-disulfamoylbenzenesulfonamide.

EXAMPLE V p-Nitro-N-sulfamoylbenzenesulfonamide (3.2 g., 0.0114 mole) is dissolved in 1:1 ethanol-water (100 ml.), and hydrogenated at 2 atm. with platinum oxide (0.1 g.) for 1½ hours. The platinum is filtered off and washed with water, giving a light yellow filtrate. The filtrate is concentrated on a rotary evaporator, giving a light yellow solid, m.p. 162° C. dec. (uncorr.). The solid is filtered with absolute ethanol, and recrystallized from water-ethanol, giving white needles of N'-sulfamoylsulfanilamide (1.4 g., 49 percent), m.p. 182°–183° C. (uncorr.).

Anal. Calcd for $C_6H_9N_3O_4S_2$: C, 28.68; H, 3.61; N, 16.72; S, 25.52.

Found: C, 28.69; H, 3.58; N, 16.49; S, 24.5, 24.8.

EXAMPLE VI

A mixture of sulfanilamide (34.4 g., 0.20 mole), sulfamide (20.2 g., 0.21 mole), and sodium hydroxide (8 g., 0.2 mole) is combined with water (100 ml.), and refluxed under a stream of nitrogen for 15 hours with evolution of ammonia. The solution is cooled to 15° C., water (300 ml.) is added, and unreacted sulfanilamide is filtered off. Then a necessary portion of a total of 16.6 ml. (0.2 mole) concentrated hydrochloric acid is added to adjust the pH to 6. More starting material is filtered off, and the filtrate is washed with 1:1 ether-ethyl acetate (200 ml.). The remaining acid is added, bringing the pH to 1. The water is then slowly removed on a rotary evaporator until at about 200 ml. crystals begin to form. More water is removed (about 20 ml.), and the mixture is cooled in ice and filtered, giving white crystals (38 g.), m.p. 176°–185° C. residue (uncorr.). The solid is recrystallized from water-ethanol, giving white needles of N'-sulfamoylsulfanilamide, (10.5 g., 21 percent), m.p. 180°–183° C. (uncorr.). The product is identical to that obtained from example V, by all the usual tests.

EXAMPLE VII

A solution of p-chlorobenzenesulfonyl chloride (21.1 g., 0.10 mole) in anhydrous dioxane (30 ml.) is added to a mixture of sulfamide (10.6 g., 0.11 mole) and potassium carbonate (34.6 g., 0.25 mole) in dioxane (100 ml.), and the mixture is reacted and worked-up in a manner similar to example I, giving a crude white solid (11.5 g., 43 percent), m.p. 159.5°–162° C. The crude solid is recrystallized from ethyl acetate-hexane, giving a white solid which is p-chloro-N-sulfamoylbenzenesulfonamide, (5.2 g., 19 percent) m.p. 160°–161° C.

Anal. Calcd for $C_6H_7ClN_2O_4S_2$: C, 26.62; H, 2.60; N, 10.35; Cl, 13.09; S, 23.69.

Found: C, 26.63; H, 2.62; N, 10.69; Cl, 12.8, 12.8; S, 23.3, 23.3.

Similarly, reacting an appropriate halobenzene-sulfonyl chloride with sulfamide, there is obtained m-iodo-N-sulfamoylbenzenesulfonamide; and p-fluoro-N-sulfamoylbenzenesulfonamide.

EXAMPLE VIII

A solution of p-chlorobenzenesulfonyl chloride (16.9 g., 0.080 mole) in anhydrous dioxane (30 ml.) is added to a mixture of N,N-dimethylsulfamide (10.5 g., 0.085 mole) and potassium carbonate (28.8 g., 0.208 mole) in anhydrous dioxane (100 ml.), and the mixture is reacted and worked-up in a manner similar to example I, giving a crude white solid (12.6 g.), m.p. 99°–110° C. (uncorr.). The crude solid is recrystallized from benzenecyclohexane, giving white crystals of p-chloro-N-dimethylsulfamoylbenzenesulfonamide, (10.0 g., 42 percent), m.p. 112°–114° C. (uncorr.).

Anal. Calcd for $C_8H_{11}ClN_2O_4S_2$: C, 32.15; H, 3.71; N, 9.38; Cl, 11.87; S, 21.46.

Found: C, 32.44; H, 3.86; N, 9.21; Cl, 11.7, 11.7; S, 21.0, 21.0.

In like manner, p-bromobenzenesulfonyl chloride is reacted with dipropylsulfamide to afford p-bromo-N-dipropylsulfamoylbenzenesulfonamide.

EXAMPLE IX

A solution of p-methoxybenzenesulfonyl chloride (16.6 g., 0.080 mole) in anhydrous dioxane (30 ml.) is added to a mixture of N,N-dimethylsulfamide (10.5 g., 0.085 mole) and potassium carbonate (28.8 g., 0.208 mole) in anhydrous dioxane (100 ml.), and the mixture is reacted and worked-up in a manner similar to example I, giving a crude white solid (11.5 g., 49 percent), m.p. 115°–120° C. (uncorr.). The crude solid is recrystallized from ethyl acetate-cyclohexane, giving white crystals of N-dimethylsulfamoyl-p-methoxybenzenesulfonamide, (7.0 g., 30 percent), m.p. 119°–122° C. (uncorr.).

Anal. Calcd for $C_9H_{14}N_2O_5S_2$: C, 36.72; H, 4.79; N, 9.52; S, 21.79.

Found: C, 36.65; H, 4.69; N, 9.30; S, 21.2, 21.3.

In a similar manner, p-propoxybenzenesulfonyl chloride is reacted with N-methylsulfamide to yield N-methylsulfamoyl-p-propoxybenzenesulfonamide.

EXAMPLE X

A solution of 2-naphthalenesulfonyl chloride (18.2 g., 0.080 mole) in anhydrous dioxane (30 ml.) is added to a mixture of N,N-dimethylsulfamide (10.5 g., 0.085 mole) and potassium carbonate (28.8 g., 0.208 mole) in anhydrous dioxane (100 cc.). The mixture is reacted and worked-up in a manner similar to example I, giving a crude white solid (9.2 g.), softens 110° C., m.p. 115°–120° C. (uncorr.). The solid is recrystallized from ethyl acetate-cyclohexane, giving white crystals of N-dimethylsulfamoyl-2-naphthalenesulfonamide, (5.0 g., 20 percent), m.p. 123°–125° C. (uncorr.).

Anal. Calcd for $C_{12}H_{14}N_2O_4S_2$: C, 45.84; H, 4.49; N, 8.91; S, 20.40

Found: C, 46.12; H, 4.44; N, 8.90; S, 20.0, 20.0.

Similarly, 2-naphthalenesulfonyl chloride is reacted with N-methylsulfamide to yield N-methylsulfamoyl-2-naphthalenesulfonamide.

EXAMPLE XI

A solution of p-methoxybenzenesulfonyl chloride (16.6 g., 0.080 mole) in anhydrous dioxane (30 ml.) is added to a mixture of sulfamide (8.1 g., 0.084 mole) and potassium carbonate (28.8 g., 0.208 mole) in anhydrous dioxane (100 ml.), and the mixture is reacted and worked-up in a manner similar to example I, giving a crude light yellow solid (7.1 g.), m.p. 118°–138° C. (uncorr.). The crude solid is recrystallized from ethyl acetate-cyclohexane, giving white crystals of p-methoxy-N-sulfamoylbenzenesulfonamide, (3.1 g., 15 percent), m.p. 146°–147° C. (uncorr.).

Anal. Calcd for $C_7H_{10}N_2O_5S_2$: C, 31.57; H, 3.79; N, 10.52; S, 24.08.

Found: C, 31.63; H, 3.74; N, 10.59; S, 23.5, 23.8.

Similarly, 2,4-dimethoxybenzenesulfonyl chloride and sulfamide are reacted to afford 2,4-dimethoxy-N-sulfamoylbenzenesulfonamide.

EXAMPLE XII

A solution of p-fluorobenzenesulfonyl chloride (15.6 g., 0.080 mole) in anhydrous dioxane (30 ml.) is added to a mixture of N,N-dimethylsulfamide (10.5 g., 0.085 mole) and potassium carbonate (28.8 g., 0.208 mole) in anhydrous dioxane (100 ml.), and the mixture is reacted and worked-up in a manner similar to example I, giving a crude white solid (12.5 g.), m.p. 114°–118° C. (uncorr.). The solid is recrystallized from benzene-cyclohexane, giving white crystals of N-dimethylsulfamoyl-p-fluorobenzenesulfonamide, (9.5 g., 42 percent), m.p. 118°–120° C. (uncorr.).

Anal. Calcd for $C_8H_{11}FN_2O_4S_2$: C, 34.03; H, 3.93; N, 9.92; F, 6.73; S, 22.71.

Found: C, 34.24; H, 4.04; N, 9.92; F, 6.8; S, 22.2, 22.3.

EXAMPLE XIII

A solution of benzenesulfonyl chloride (14.2 g., 0.080 mole) in anhydrous dioxane (30 ml.) is added to a mixture of N,N-dimethylsulfamide (10.5 g., 0.085 mole) and potassium carbonate (28.8 g., 0.208 mole) in anhydrous dioxane (100 ml.), and the mixture is reacted and worked-up in a manner similar to example I, giving a crude white solid (5.1 g., 24 percent), m.p. 81°–85° C. (uncorr.). The crude solid is recrystallized from ether-hexane, giving white crystals of N-dimethylsulfamoylbenzenesulfonamide, m.p. 83°–85° C. (uncorr.).

Anal. Calcd for $C_8H_{12}N_2O_4S_2$: C, 36.35; H, 4.57; N, 10.60; S, 24.26.

Found: C, 36.87; H, 4.62; N, 10.13; Cl, 23.6, 23.6.

In like manner, benzenesulfonyl chloride is reacted with N,N-dibutylsulfamide to yield N-dibutylsulfamoylbenzenesulfonamide.

EXAMPLE XIV

A solution of p-nitrobenzenesulfonyl chloride (22.2 g., 0.10 mole) in anhydrous dioxane (30 ml.) is added to a mixture of N,N-dimethylsulfamide (13.1 g., 0.105 mole) and potassium carbonate (34.6 g., 0.25 mole) in anhydrous dioxane (100 ml.), and the mixture is reacted and worked-up in a manner similar to prior examples, giving a crude yellow solid (12.4 g.), m.p. 120°–125° C. (uncorr.). The crude solid is recrystallized from ethyl acetate-hexane, giving yellow crystals of N-dimethylsulfamoyl-p-nitrobenzenesulfonamide, (6.9 g., 22 percent), m.p. 125°–127° C. (uncorr.).

Anal. Calcd for $C_8H_{11}N_3O_6S_2$: C, 31.06; H, 3.59; N, 13.59; S, 20.73.

Found: C, 31.30; H, 3.48; N, 13.84; S, 20.3, 20.6.

Similarly, reacting p-nitrobenzenesulfonyl chloride with N-ethylsulfamide, there is obtained N-ethylsulfamoyl-p-nitrobenzenesulfonamide.

EXAMPLE XV

N-Dimethylsulfamoyl-p-nitrobenzenesulfonamide (12.7 g., 0.041 mole) is dissolved in absolute ethanol (100 ml.), and hydrogenated at 2 atm. with platinum oxide (0.4 g.) for 15 minutes. The mixture is worked-up in a manner similar to example V, giving a crude orange solid, m.p. 186°–187° C. (uncorr.). The crude solid is recrystallized from water-ethanol, giving a light yellow solid of N'-dimethylsulfamoylsulfanilamide, (8.2 g., 72 percent), m.p. 188°–190° C. (uncorr.)

Anal. Calcd for $C_8H_{13}N_3O_4S_2$: C, 34.40; H, 4.69; N, 15.04.

Found: C, 34.38; H, 4.54; N, 14.70.

EXAMPLE XVI

A solution of 2,5-dichlorobenzenesulfonyl chloride (19.6 g., 0.080 mole) in anhydrous dioxane (30 ml.) is added to a mixture of 1-piperidinesulfonamide (13.8 g., 0.084 mole) and potassium carbonate (28.8 g., 0.208 mole) in anhydrous dioxane (100 cc.), and the mixture is stirred at 70° C. for 18 hours and then refluxed for 4 hours. The mixture is cooled to 20° C., and then filtered. The solid is stirred with water (4×250 ml.), and filtered after each leaching. A white solid remained which is recrystallized from water, giving N-(2,5-dichlorobenzenesulfonyl)-1-piperidinesulfonamide, potassium salt as white crystals (13.4 g., 41 percent), m.p. 225°–229° C. (uncorr.).

Anal. Calcd for $C_{11}H_{13}Cl_2N_2O_4S_2K$: C, 32.11; H, 3.19; N, 6.81; Cl, 17.24; S, 15.59.

Found: C, 32.45; H, 3.23; N, 6.47; C, 17.2, 17.4; S, 15.0.

The filtrate of the above salt is worked-up in a manner similar to example I, giving N-(2,5-dichlorobenzenesulfonyl)-1-piperidinesulfonamide as a crude white solid (3.8 g.), m.p. 177°–181° C. (uncorr.). The crude solid is recrystallized from ethyl acetate-hexane, giving white crystals (3.8 g., 13 percent), m.p. 182°–186° C. (uncorr.).

Anal. Calcd for $C_{11}H_{14}Cl_2N_2O_4S_2$: C, 35.39; H, 3.78; N, 7.50; Cl, 19.00; S, 17.18.

Found: C, 35.38; H. 3.70; N, 7.47; Cl, 19.0, 19.1, 19.1; S, 16.5, 16.6.

EXAMPLE XVII

A solution of 2,5-dichlorobenzenesulfonyl chloride (19.6 g., 0.080 mole) in anhydrous dioxane (30 ml.) is added to a mixture of N,N-dimethylsulfamide (10.5 g., 0.085 mole) and potassium carbonate (28.8 g., 0.208 mole) in anhydrous dioxane (100 cc.), and the mixture is reacted and worked-up in a manner similar to example I, giving a crude white solid (14.5 g.), m.p. 181°–189° C. (uncorr.). The solid is recrystallized from ethyl acetate-hexane, giving white crystals of 2,5-dichloro-N-dimethylsulfamoylbenzenesulfonamide, (9.0 g., 34 percent), m.p. 195°–197° C. (uncorr.).

Anal. Calcd for $C_8H_{10}Cl_2N_2O_4S_2$: C, 28.83; H, 3.02; N, 8.41; Cl, 21.28; S, 19.25.

Found: C, 29.01; H, 3.30; N, 7.99; Cl, 20.9, 21.0; S, 18.7, 18.8.

In like manner, 2,5-dibromo-N-methylsulfamoylbenzenesulfonamide and 2,5-diethyl-N-propylsulfamoylbenzenesulfonamide are synthesized.

EXAMPLE XVIII

A solution of 2-naphthalenesulfonyl chloride (18.2 g., 0.080 mole) in anhydrous dioxane (30 ml.) is added to a mixture of 1-piperidinesulfonamide (13.8 g., 0.084 mole) and potassium carbonate (28.8 g., 0.208 mole) in anhydrous dioxane (100 ml.) and the mixture is reacted and worked-up in a manner similar to example I, giving a crude colorless oil (7.65 g.). The oil is dissolved in ether (150 ml.), and extracted with water (100 ml.) containing sodium bicarbonate (1.72 g.). The water is concentrated on a rotary evaporator, giving a white solid. The water is removed by azeotroping with benzene, and removing the benzene on a rotary evaporator. The solid is washed with anhydrous ether, giving a white solid (7.3 g.), m.p. 263°–265° C. (uncorr.). The solid is recrystallized from absolute ethanol, giving white crystals of N-(2-naphthalenesulfonyl)-1-piperidinesulfonamide, sodium salt, (4.5 g., 15 percent) m.p. 268°–270° C. (uncorr.).

Anal. Calcd for $C_{15}H_{17}N_2O_4S_2Na$: C, 47.86; H, 4.56; N, 7.44.

Found: C, 48.11; H, 4.56; N, 7.52.

EXAMPLE XIX

A solution of p-toluenesulfonyl chloride (15.3 g. 0.080 mole) in anhydrous dioxane (30 ml.) is added to a mixture of 1-piperidinesulfonamide (13.8 g., 0.084 mole) and potassium carbonate (28.8 g., 0.208 mole) in anhydrous dioxane (100 ml.), and the mixture is reacted and worked-up in a manner similar to example I, giving a white solid (17.0 g., 67 percent), m.p. 138°–142° C. (uncorr.). The solid is recrystallized from ethyl acetate-hexane, giving white crystals of N-(p-tolylsulfonyl)-1-piperidinesulfonamide, m.p. 140°–143° C. (uncorr.).

Anal. Calcd for $C_{12}H_{18}N_2O_4S_2$: C, 45.26; H, 5.70; N, 8.80; S, 20.14.

Found: C, 45.28; H. 5.72; N, 8.78; S, 19.4, 19.4.

In a similar manner, p-ethylbenzenesulfonyl bromide is reacted with 1-piperidinesulfonamide to yield N-(p-ethylbenzenesulfonyl)-1-piperidinesulfonamide.

EXAMPLE XX

A solution of p-methoxybenzenesulfonyl chloride (16.6 g., 0.080 mole) in anhydrous dioxane (30 ml.) is added to a mixture of 1-piperidinesulfonamide (13.8 g., 0.084 mole) and potassium carbonate (28.8 g., 0.208 mole) in anhydrous dioxane (100 ml.), and the mixture is reacted and worked-up in a manner similar to example XVIII, giving a crude white solid. The solid is recrystallized from absolute ethanol, giving white crystals of N-(p-methoxybenzenesulfonyl)-1-piperidinesulfonamide, sodium salt, (8.7 g., 31 percent), m.p. 240°–244° C. (uncorr.).

Anal. Calcd for $C_{12}H_{17}N_2O_5S_2Na$: C, 40.44; H, 4.81; N, 7.86; S, 17.99.

Found: C, 40.32; H, 4.51; N, 7.58; S, 14.8, 15.2, 16.4, 16.8.

In a similar manner, 2,5-diethoxybenzenesulfonyl chloride is reacted with 1-piperidinesulfonamide to yield N-(2,5-diethoxybenzenesulfonyl)-1-piperidinesulfonamide.

EXAMPLE XXI

A solution of p-bromobenzenesulfonyl chloride (20.5 g., 0.080 mole) in anhydrous dioxane (30 ml.) is added to a mixture of 1-piperidinesulfonamide (13.8 g., 0.084 mole) and potassium carbonate (28.8 g., 0.208 mole) in anhydrous dioxane (100 ml.), and the mixture is reacted and worked-up in a manner similar to example I, giving a crude white solid (7.5 g., 24 percent), m.p. 137.5°–141° C. (uncorr.). The solid is recrystallized from ethyl acetate-hexane, giving white crystals of N-(p-bromobenzenesulfonyl)-1-piperidinesulfonamide, (4.0 g., 13 percent), m.p. 139.5°–142.5° C. (uncorr.).

Anal. Calcd for $C_{11}H_{15}BrN_2O_4S_2$: C, 34.46; H, 3.95; N, 7.31; Br, 20.85; S, 16.73.

Found: C, 34.72; H, 3.79; N, 7.00; Br, 20.7, 20.7; S, 16.0, 16.0.

Similarly, p-trifluoromethylbenzenesulfonyl chloride and 1-piperidinesulfonamide are reacted to yield N-(p-trifluoromethylbenzenesulfonyl)-1-piperidinesulfonamide.

EXAMPLE XXII

A mixture of 2-amino-4-chlorobenzenesulfonamide (10.3 g., 0.050 mole), sulfamide (6.25 g., 0.065 mole), and sodium hydroxide (2.0 g., 0.050 mole) is combined with water (50 ml.), and refluxed under a stream of nitrogen for 4 hours. The solution is then worked-up in a manner similar to example III, giving a white solid (2.8 g.), m.p. 179° C. to a foam (uncorr.). The solid is recrystallized from ethyl acetate-hexane, giving white crystals of 2-amino-4-chloro-N-sulfamoylbenzenesulfonamide, (2.5 g., 18 percent) m.p. 171° bubbles (uncorr.).

Anal. Calcd for $C_6H_8ClN_3O_4S_2$: C, 25.22; H, 2.82; N, 14.71; Cl, 12.41; S, 22.44.

Found: C, 25.70; H, 2.80; N, 14.38; Cl, 12.0, 12.3; S, 21.8, 21.9, 21.9.

Similarly, 2-fluoro-4-propylbenzenesulfonamide is reacted with sulfamide to afford 2-fluoro-4-propyl-N-sulfamoylbenzenesulfonamide.

EXAMPLE XXIII

A solution of 4-chloro-3-nitrobenzenesulfonyl chloride (20.5 g., 0.080 mole) in anhydrous dioxane (30 ml.) is added to a mixture of 1-piperidinesulfonamide (13.8 g., 0.084 mole) and potassium carbonate (28.8 g., 0.208 mole) in anhydrous dioxane (100 ml.) plus dimethylformamide (1 ml.), and the mixture is reacted and worked-up in a manner similar to example I, giving a crude yellow solid (5.6 g.), m.p. 173°–176° C. (uncorr.). The solid is recrystallized from ethyl acetate-hexane, giving yellow crystals of N-(4-chloro-3-nitrophenylsulfonyl)-1-piperidinesulfonamide, (3.5 g., 11 percent), m.p. 177°–179.5° C. (uncorr.).

Anal. Calcd for $C_{11}H_{14}ClN_3O_6S_2$: C, 34.42; H, 3.68; N, 10.95; Cl, 9.24; S, 16.71.

Found: C, 34.64; H, 3.31; N, 11.14; Cl, 9.4; S, 16.5, 16.5.

EXAMPLE XXIV

A solution of m-nitrobenzenesulfonyl chloride (17.7 g., 0.080 mole) in anhydrous dioxane (30 ml.) is added to a mixture of 1-piperidinesulfonamide (13.8 g., 0.084 mole) and potassium carbonate (28.8 g., 0.208 mole) in anhydrous dioxane (100 ml.), and the mixture is reacted and worked-up in a manner similar to example I, giving a crude yellow oil (15.3 g.). The oil is then hydrogenated in a manner similar to example V, giving a white solid, m.p. 204° C. bubbles (uncorr.). The solid is recrystallized from water, giving a white solid of N-(m-aminophenylsulfonyl)-1-piperidinesulfonamide, (6.0 g., 24 percent), m.p. 205°–206° C. (uncorr.).

Anal. Calcd for $C_{11}H_{17}N_3O_4S_2$: C, 41.36; H. 5.37; N, 13.15.

Found: C, 41.38; H. 5.13; N, 12.79.

EXAMPLE XXV

A solution of p-fluorobenzenesulfonyl chloride (15.6 g., 0.080 mole) in anhydrous dioxane (30 ml.) is added to a mixture of 1-piperidinesulfonamide (13.8 g., 0.084 mole) and potassium carbonate (28.8 g., 0.208 mole) in anhydrous dioxane (100 ml.), and the mixture is reacted and worked-up in a manner similar to example I, giving an oil (8.1 g.). The sodium salt is prepared in a manner similar to example XVIII, and then the acid (7.0 g., 27 percent), m.p. 117°–120° C. (uncorr.), is liberated from the salt. The solid is recrystallized from ethyl acetate-hexane, giving white crystals of N-(p-fluorophenylsulfonyl)-1-piperidinesulfonamide, m.p. 118°–121° C. (uncorr.).

Anal. Calcd for $C_{11}H_{15}FN_2O_4S_2$: C, 40.98; H, 4.69; N, 8.69; S, 19.90.

Found: C, 41.00; H, 4.40; N, 8.40; S, 19.0, 19.0.

EXAMPLE XXVI

A solution of p-nitrobenzenesulfonyl chloride (35.5 g., 0.16 mole) in anhydrous dioxane (50 ml.) is added to a mixture of 1-piperidinesulfonamide (26.6 g., 0.162 mole) and potassium carbonate (55.5 g., 0.40 mole) in anhydrous dioxane (150 ml.), and the mixture is reacted and worked-up in a manner similar to example I, giving a yellow solid of N-(p-nitrophenylsulfonyl)-1-piperidinesulfonamide, (37.0 g., 66 percent), m.p. 172°–174° C. (uncorr.). The solid is recrystallized from ethyl acetate-hexane, giving light yellow crystals (22.6 g.), m.p. 173°–174° C. (uncorr.).

Anal. Calcd for $C_{11}H_{15}N_3O_6S_2$: C, 37.81; H, 4.33; N, 12.03.

Found: C, 37.82; H, 4.23; N, 11.82.

In like manner, reacting p-carbamoylbenzenesulfonyl chloride with 1-piperidinesulfonamide affords N-(p-carbamoylphenylsulfonyl)-1-piperidinesulfonamide.

EXAMPLE XXVII

N-(p-nitrophenylsulfonyl)-1-piperidinesulfonamide (12.0 g., 0.0343 mole) is dissolved in absolute ethanol (200 ml.), and hydrogenated at 2 atm. with platinum oxide (0.4 g.) for a half hour. The mixture is worked-up in a manner similar to example V, giving a crude tan solid, m.p. 203° C. bubbles (uncorr.). The solid is recrystallized from water-isopropanol, giving yellow crystals of N-sulfanilyl-1-piperidinesulfonamide (7.6 g., 69 percent), m.p. 206.5° C. bubbles (uncorr.).

Anal. Calcd for $C_{11}H_{17}N_3O_4S_2$: C, 41.36; H, 5.37; N, 13.15. Found: C, 41.62; H, 5.47; N, 12.88.

EXAMPLE XXVIII

A solution of p-nitrobenzenesulfonyl chloride (55.5 g., 0.25 mole) in anhydrous dioxane (50 ml.) is added to a mixture of 1-morpholinesulfonamide (43.6 g., 0.262 mole) and potassium carbonate (86.5 g., 0.625 mole) in anhydrous dioxane (200 ml.), and the mixture is reacted and worked-up in a manner similar to example V, giving a crude light yellow solid (27.0 g., 31 percent), m.p. 195° C. dec. (uncorr.). The crude solid is recrystallized from ethyl acetate-hexane, giving light yellow crystals of N-(p-nitrophenylsulfonyl)-1-morpholinesulfonamide, (21.2 g., 24 percent), m.p. 196°–197° C. dec. (uncorr.).

Anal. Calcd for $C_{10}H_{13}N_3O_7S_2$: C, 34.19; H, 3.73; N, 11.96. Found: C, 34.30; H, 3.78; N, 11.96.

EXAMPLE XXIX

N-(p-Nitrophenylsulfonyl)-1-morpholinesulfonamide (12.0 g., 0.0342 mole) is dissolved in absolute ethanol (250 ml.), and hydrogenated at 2 atm. with platinum oxide (0.4 g.) for a half hour. The mixture is worked-up in a manner similar to example V, giving a crude white solid (9.7 g., 88 percent), m.p. 190°–191° C. (uncorr.). The crude solid is recrystallized from ethanol, giving white crystals of N-sulfanilyl-4-morpholinesulfonamide, (6.4 g., 58 percent), m.p. 192°–194° C. (uncorr.).

Anal. Calcd for $C_{10}H_{15}N_3O_5S_2$: C, 37.37; H, 4.71; N, 13.08. Found: C, 37.98; H, 4.63; N, 13.04.

EXAMPLE XXX

1-Indolinesulfonamide is prepared by the method described in German Pat. No. 869,065.

A melt of indoline (35.8 g., 0.30 mole) and sulfamide (28.8 g., 0.30 mole) is stirred under a stream of nitrogen while the temperature of the melt is increased from 90° C. to 120° C. over 1 hour. The temperature is kept at 120° C. for an additional 4 hours, and then the melt is allowed to solidify at room temperature. The solid is crushed up and partitioned between 1:1 aqueous hydrochloric acid (500 ml.) and 1:1 ether-ethyl acetate (1 l.). The aqueous phase is extracted with more 1:1 ether-ethyl acetate (250 ml.), and the combined organic extract is washed with water, 5 percent aqueous sodium bicarbonate, saturated aqueous sodium chloride, and dried through sodium sulfate. The organic solution is concentrated on a rotary evaporator, giving a light red solid (37.1 g.), m.p. 142°–150° C. The solid is recrystallized from ethyl acetate-hexane, with charcoal, giving light pink crystals of 1-indolinesulfonamide, (29.6 g., 50 percent), m.p. 148°–152° C. (uncorr.).

Anal. Calcd for $C_8H_{10}N_2O_2S$: C, 48.47; H, 5.09, N, 14.13; S, 16.17. Found: C, 48.38; H, 5.17; N, 13.88; S, 15.2, 15.3.

A solution of p-nitrobenzenesulfonyl chloride (22.2 g., 0.10 mole) in anhydrous dioxane (30 ml.) is added to a mixture of 1-indolinesulfonamide (19.8 g., 0.10 mole) and potassium carbonate (34.6 g., 0.25 mole) in anhydrous dioxane (100 ml.) and the mixture is reacted and worked-up in a manner similar to example I, giving a crude yellow solid (22.4 g., 58 percent), m.p. 192°–193° C. (uncorr.). The solid is recrystallized from ethyl acetate-hexane, giving yellow crystals of N-(p-nitrophenylsulfonyl)-1-indolinesulfonamide, m.p. 190°–191° C. (uncorr.).

Anal. Calcd for $C_{14}H_{13}N_3O_6S_2$: C, 43.86; H, 3.42; N, 10.96. Found: C, 43.97; H, 3.29; N, 11.25.

EXAMPLE XXXI

The above prepared N-(p-nitrophenylsulfonyl)-1-indolinesulfonamide (8.4 g., 0.0219 mole) is dissolved in warm absolute ethanol (200 ml.), and hydrogenated at 2 atm. with platinum oxide (0.4 g.) for 17 minutes. The mixture is worked up in a manner similar to example V, giving a yellow solid (7.6 g., 98 percent), m.p. 189° C. dec. (uncorr.). The solid is recrystallized from water, giving yellow crystals of N-sulfanilyl1-indolinesulfonamide (1.8 g., 23 percent), m.p. 190°–192° C. (uncorr.).

Anal. Calcd for $C_{14}H_{15}N_3O_4S_2$: C, 47.58; H, 4.28; N, 11.89. Found: C, 47.67; H, 4.28; N, 12.13

EXAMPLE XII

Acetyl chloride (2.84 cc., 0.040 mole) is added to a stirred mixture of N'-sulfamoylsulfanilamide (10.1 g., 0.042 mole) and sodium bicarbonate (3.36 g., 0.040 mole) in anhydrous dioxane (100 ml.). The mixture is stirred 1.25 hours at room temperature, heated briefly on the steam bath, and then filtered with suction. The filtrate is concentrated on a rotary evaporator, giving an amorphous white solid, m.p. 114°–130° C. (uncorr.). The solid is dissolved in ethyl acetate (about 100 ml.) on the steam bath, causing a white crystalline solid (7.0 g., 60 percent), m.p. 162° C. (to a foam) that does not melt at 300° C. (uncorr.), to form almost as soon as the amorphous solid is dissolved. The crystalline solid is recrystallized from ethanol-ethyl acetate, giving white crystals of 4'-(N-sulfamoyl)sulfamoylacetanilide, (4.0 g., 34 percent), m.p. 167° C. to a foam that chars at 255° C. (uncorr.).

Anal. Calcd for $C_8H_{11}N_3O_5S_2$: C, 32.75; H, 3.78; N, 14.32. Found: C, 33.00; H, 3.87; N, 14.38.

EXAMPLE XXXIII

Repeating the procedure of example I to react an appropriate sulfonyl halide with a sulfamide, in the presence of an alkali metal carbonate, in a reaction-inert aprotic organic solvent, compounds of the following structural formula are prepared:

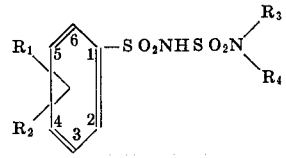

wherein $R_1$, $R_2$ and $R_3$ and $R_4$ taken separately are defined:

| $R_1$ | $R_2$ | $R_3$ | $R_4$ |
|---|---|---|---|
| 4-COOCH$_3$ | —H | —H | —H |
| 2-CH$_3$ | 5-CH$_3$ | —C$_4$H$_9$ | —H |
| 4-SCH$_3$ | —H | —H | —H |
| 4-COOC$_4$H$_9$ | —H | —CH$_3$ | —CH$_3$ |
| 3-SO$_2$CH$_3$ | —H | —C$_2$H$_5$ | —C$_2$H$_5$ |
| 5-CH$_3$ | 2-I | —CH$_3$ | —CH$_3$ |
| 4-NH$_2$COC$_3$H$_7$ | —H | —H | —H | and wherein $R_1$, $R_2$ and $R_3$ and $R_4$ taken together are defined:

| $R_1$ | $R_2$ | $R_3$-$R_4$ |
|---|---|---|
| —H | —H | Pyrrolidino. |
| 4-Cl | —H | Piperazino. |
| 4-N(CH$_3$)$_2$ | —H | 4-methylpiperazino. |
| 3-SO$_2$C$_2$H$_5$ | —H | Morpholino. |
| 2-Cl | 5-Cl | 4-ethylpiperazino. |
| 4-SC$_2$H$_5$ | —H | 4-phenylpiperazino. |
| —H | —H | 4-(p-chlorophenyl)-piperazino. |
| —H | —H | 4-(p-fluorophenyl)-piperazino. |
| 4-CH$_3$ | —H | 4-(m-iodophenyl)piperazino. |
| —H | —H | 4-(p-bromophenyl)-piperazino. |

What is claimed is:
1. N-sulfamoyl-p-toluenesulfonamide.

* * * * *